United States Patent
Spengler et al.

(10) Patent No.: US 8,943,274 B2
(45) Date of Patent: Jan. 27, 2015

(54) CHANGING POWER STATE WITH AN ELASTIC CACHE

(75) Inventors: David Louis Spengler, Colorado Springs, CO (US); Aaron Danis, Colorado Springs, CO (US); William Anthony Pagano, Colorado Springs, CO (US)

(73) Assignee: Seagate Technology LLC, Cupertino, CA (US)

( * ) Notice: Subject to any disclaimer, the term of this patent is extended or adjusted under 35 U.S.C. 154(b) by 276 days.

(21) Appl. No.: 13/477,768

(22) Filed: May 22, 2012

(65) Prior Publication Data

US 2013/0318299 A1 Nov. 28, 2013

(51) Int. Cl.
- G06F 12/00 (2006.01)
- G06F 12/02 (2006.01)
- G06F 12/08 (2006.01)
- G06F 1/30 (2006.01)

(52) U.S. Cl.
CPC ........ G06F 12/0223 (2013.01); G06F 12/0864 (2013.01); G06F 12/0871 (2013.01); G06F 1/30 (2013.01)
USPC ............................ 711/129; 711/154; 711/173

(58) Field of Classification Search
CPC ....... G06F 1/3203; G06F 1/3275; G06F 1/30; G06F 12/0871; G06F 12/0864
USPC .................. 711/118, 129, 154, 173
See application file for complete search history.

(56) References Cited

U.S. PATENT DOCUMENTS

| | | | |
|---|---|---|---|
| 5,812,418 A | 9/1998 | Lattimore et al. | |
| 7,127,560 B2 | 10/2006 | Cohen et al. | |
| 7,136,984 B2 | 11/2006 | Maiyuran et al. | |
| 7,177,222 B2 | 2/2007 | Spengler | |
| 7,321,521 B2 | 1/2008 | Spengler | |
| 7,394,717 B2 | 7/2008 | Hidaka | |
| 7,424,663 B2 | 9/2008 | Mehalel | |
| 7,533,241 B2 | 5/2009 | Begon et al. | |
| 7,661,005 B2 | 2/2010 | Spengler et al. | |
| 2001/0009521 A1 | 7/2001 | Hidaka | |
| 2002/0112126 A1* | 8/2002 | Hayakawa et al. | 711/128 |
| 2002/0129201 A1 | 9/2002 | Maiyuran et al. | |
| 2003/0090937 A1 | 5/2003 | Chen | |
| 2008/0005474 A1* | 1/2008 | Long | 711/118 |
| 2008/0147976 A1 | 6/2008 | Bienek et al. | |
| 2010/0082905 A1 | 4/2010 | Wilkerson et al. | |
| 2010/0191990 A1* | 7/2010 | Zhang et al. | 713/320 |
| 2010/0229018 A1* | 9/2010 | Hutchison et al. | 713/340 |
| 2011/0283124 A1* | 11/2011 | Branover et al. | 713/323 |
| 2012/0036328 A1* | 2/2012 | Bay et al. | 711/146 |
| 2012/0131145 A1* | 5/2012 | Garg | 709/219 |
| 2012/0221879 A1* | 8/2012 | Hutchison et al. | 713/340 |
| 2013/0036270 A1* | 2/2013 | Dreslinski et al. | 711/128 |

* cited by examiner

*Primary Examiner* — John Lane
(74) *Attorney, Agent, or Firm* — Hall Estill Attorneys at Law (57) ABSTRACT

An apparatus and associated method is provided employing data capacity determination logic. The logic dynamically changes a data storage capacity of an electronic data storage memory. The change in capacity is made in relation to a transient energy during a power state change sequence performed by the electronic data storage memory.

20 Claims, 6 Drawing Sheets

CHANGING POWER STATE WITH AN ELASTIC CACHE

SUMMARY

In some embodiments an apparatus is provided having data capacity determination logic. The logic executes computer instructions stored in memory to dynamically change a data storage capacity of an electronic data storage memory. The change in capacity is made in relation to a transient energy during a power state change sequence performed by the electronic data storage memory.

In some embodiments a method is provided including characterizing a transient supply energy during a power state change sequence performed by an electronic data storage memory; and dynamically changing a data storage capacity of the electronic data storage memory in relation to the transient energy during the power enable sequence.

In some embodiments an apparatus is provided that has a cache device, and a power supply responsive to a power enable signal to electrically energize the cache device by invoking a power enable sequence. The apparatus further has data capacity determination circuitry that dynamically changes a data storage capacity of the cache device in relation to a transient supply energy to the cache device during the power enable sequence.

DETAILED DESCRIPTION

To operate properly, electrical circuitry often requires a continuous supply of electrical energy. The energy can be provided from a source at one or more nominal voltage levels, and current is drawn at these respective voltage levels. The circuitry can operate in a variety of modes each having different associated levels of energy consumption.

One general type of such circuitry provides an array of storage cells that store electrical charge in order to serve as a memory space for digital data. Data are read from and written to the various cells to carry out a data transfer operation with other circuitry. An illustrative use of memory such as this for purposes of this description is that of a write back cache in a controller that manages top level functionality of a redundant array of independent (RAID) storage devices. By "write back" it is meant, in accordance with the ordinary meaning to the skilled artisan, that a write command can be acknowledged by the target device at a time when the data associated with that write command still resides in the cache. The controller in the case of write back caching has the opportunity to schedule a transfer of the data from cache to the target device's storage space at a more convenient subsequent time.

The cache size in such systems has grown exponentially to keep pace with the continual market forces demanding larger capacity and faster throughput capability. A drawback of such large cache devices is that during transient energy swings, meaning times when the available energy to the cache is changing such as during a power-on sequence and a power-off sequence, the cache is unavailable for processing commands until or only during the time when the operational voltage is supplied to the cache. The claimed invention is directed to novel and nonobvious improvements in the art making a portion of the cache available for use during the transient energy cycles.

Figure 1:
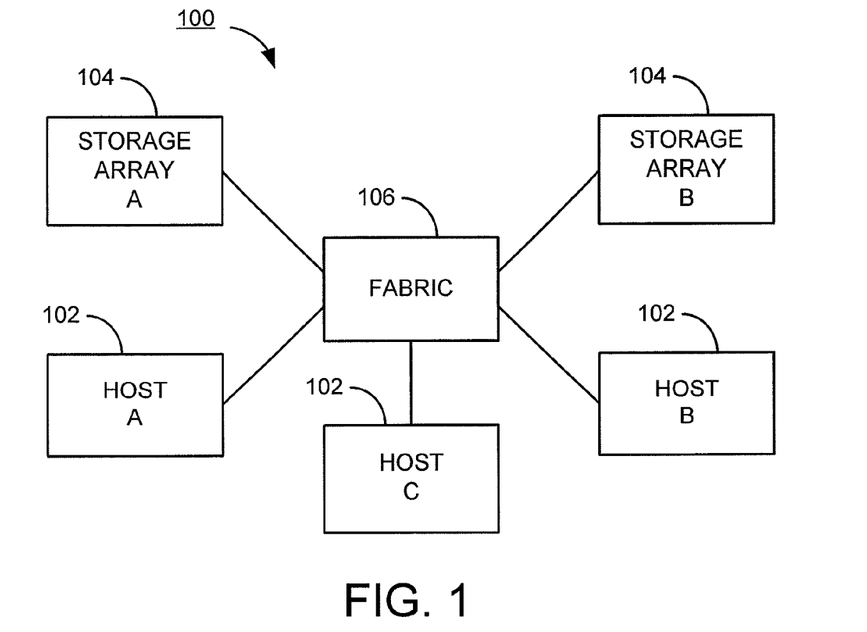
FIG. 1 is a functional block depiction of a computer-based system characterized as a wide-area network utilizing mass storage.

To illustrate an exemplary environment in which presently preferred embodiments of the present invention can be advantageously practiced, FIG. 1 shows a computer-based system 100 characterized as a wide area network (WAN) utilizing mass storage.

The system 100 includes a number of host computers 102, respectively identified as hosts A, B and C. The host computers 102 interact with each other as well as with a pair of data storage arrays 104 (denoted A and B, respectively) via a fabric 106. The fabric 106 is preferably characterized as a fibre-channel based switching network, although other configurations can be utilized as well including the Internet.

It is contemplated that the A host computer 102 and the A data storage array 104 are physically located at a first site, the B host computer 102 and B storage array 104 are physically located at a second site, and the C host computer 102 is at yet a third site, although such is merely illustrative and not limiting.

Figure 2:
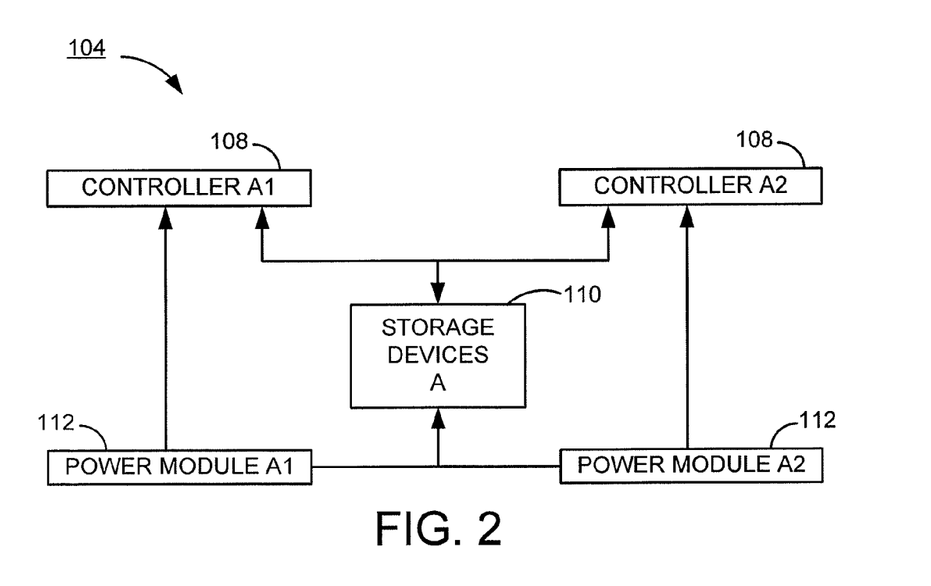
FIG. 2 depicts the general architecture of one of the data storage arrays of FIG. 1.

As shown in FIG. 2, each array 104 includes a pair of controllers 108 (denoted A1/A2) and a set of data storage devices 110, such as solid state drives, other solid state memory devices, disc drives, and the like, preferably operated as a RAID (redundant array of independent devices). As such, the controllers 108 and data storage devices 110 preferably utilize a fault tolerant arrangement so that the various controllers 108 utilize parallel, redundant links and at least some of the user data stored by the system 100 is mirrored on both sets of data storage devices 110.

Each array 104 further includes a pair of power modules 112 (A1/A2) that supply electrical power to the controllers 108 and the data storage devices 110. The power modules 112 are preferably configured to operate in tandem so that during normal operation the power module A1 supplies power to the controller A1 and to half of the data storage devices 110, and the power module A2 supplies power to the controller A2 and to the other half of the data storage devices 110. Each power module 112 is further sized and configured to be able to individually supply all of the power for the array 104 should the other power module 112 become inoperative.

Figure 3:
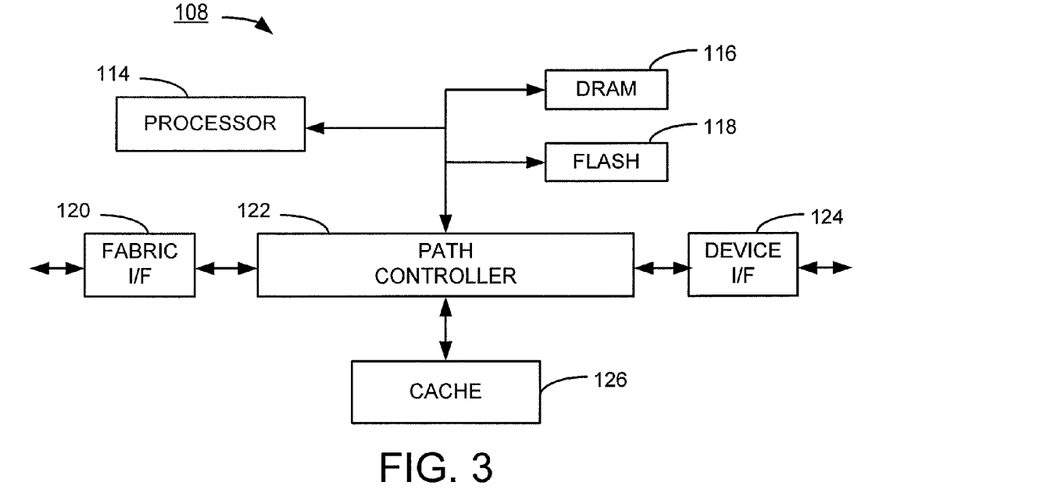
FIG. 3 depicts a functional block diagram of one of the controllers of FIG. 2.

FIG. 3 provides a functional diagram of a selected one of the controllers 108 of FIG. 2. A main processor 114 uses programming and data stored in refreshed memory 116 (DRAM) and non-volatile memory (flash) 118 to provide top level control. A communication path is provided by a fabric interface (I/F) block 120, a path controller 122 and a device interface (I/F) block 124.

A cache memory device 126 provides a memory space for the temporary storage of data being transferred between the host computers 102 (FIG. 1) and the storage devices 110 (FIG. 1). For reference without limitation, the cache 126 can be characterized as one or more DRAM modules having a total selected storage capacity (such as on the order of multiple gigabytes, GB).

Figure 4:
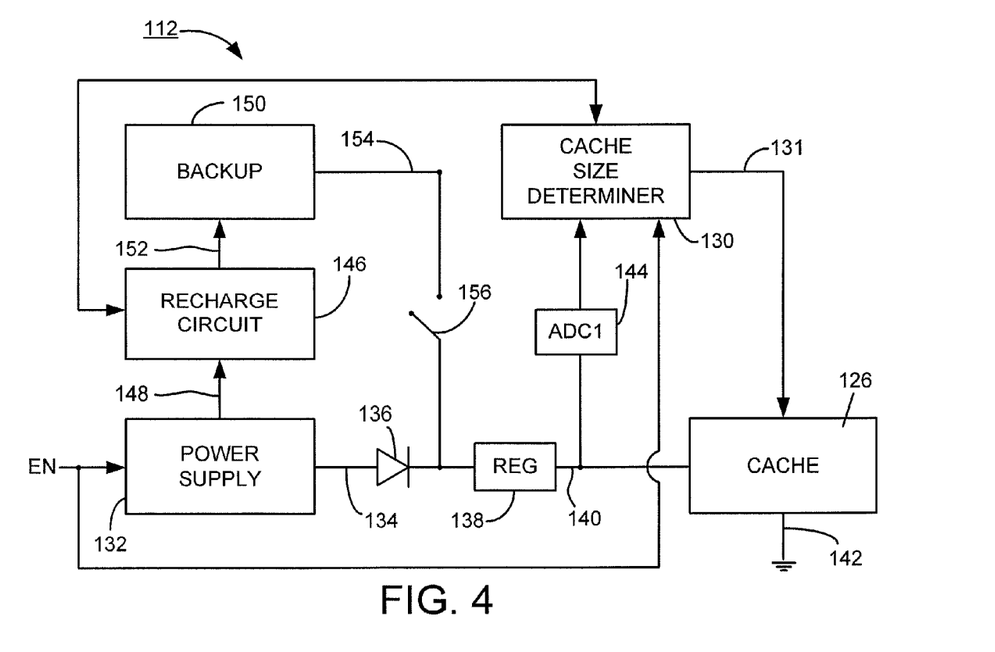
FIG. 4 depicts portions of one of the power modules of FIG. 2.

FIG. 4 shows relevant portions of a selected one of the power modules 112 of FIG. 2 in accordance with embodiments of the present invention. It will be understood that FIG. 4 is generally directed to that portion of the module 112 that contains data capacity determination logic in the form of computer instructions stored in a cache size determiner 130 that dynamically signals via path 131 for a change in a data storage capacity of the cache 126 in relation to a transient energy event associated with a power state change sequence performed by the power module 112. For purposes of this description and the appended claims "power state change sequence" means the executable steps the power module 112 invokes to change the power state from among various different steady states such as fully enabled, standby, sleep, and powered down states, and the like. It is noted that FIG. 4 also provides ancillary descriptions as well such as providing operational and backup power to the cache 126.

A power supply 132 operates to receive input AC power from a source (not shown) and output various associated DC voltages on different supply paths, such as the path 134. For the sake of an illustrative description entirely, without limitation, the output voltage from the power supply 132, herein referred to as the "supply power," can be provided at a nominal value such as 12V.

This supply voltage is supplied through protection diode 136 to a regulator 138 which applies voltage regulation to provide an output regulated voltage to path 140. The regulated voltage passes to the cache 126, a ground connection 142 denoting the completion of this main power supply loop.

An analog to digital converter ("ADC") 144 provides a digital indication of the available energy to a control block denoted descriptively as the cache size determiner 130. The cache size determiner 130 can be constructed of hardware or of a software/firmware routine, as desired.

Continuing with the circuitry of FIG. 4, an energy storage recharge circuit 146 receives input voltage from the power supply via path 148 to selectively apply recharging current to a backup power device 150, such as a battery and/or a capacitor and the like, via path 152. As discussed below, the backup power device 150 is configured to supply backup power to the cache 126 during an anomalous condition (i.e., failure of the power supply 132) to maintain the cache 126 in a powered mode, thereby allowing the cache 126 to save the then-existing contents stored therein until appropriate remedial corrective actions can be taken regarding long-term supply power.

The backup power device 150 supplies a backup energy source on path 154. During normal operation, path 154 is preferably coupled to path 134 (i.e., switching element 156 is closed) so that the regulator 138 receives power from both the power supply 132 and the backup power device 150. This advantageously assures that should the power supply 132 be interrupted, power will continue to flow to the cache 126. The switching element 156 can comprise a suitable transistor, one or more protection diodes, etc., as desired.

Figure 5:
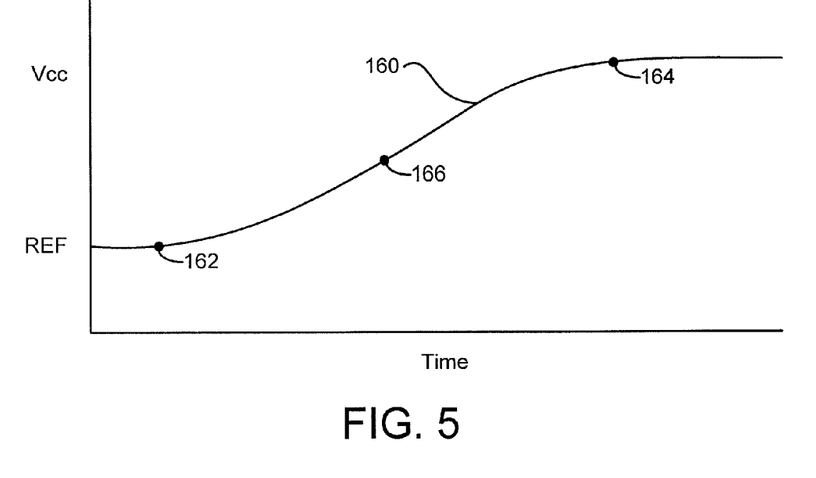
FIG. 5 graphically depicts the transient supply voltage during a power-on sequence.
Figure 6:
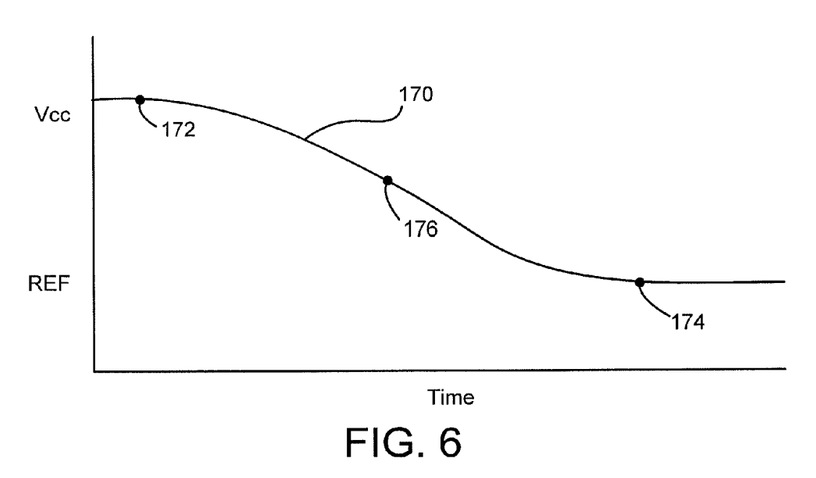
FIG. 6 graphically depicts the transient supply voltage during a power-off sequence.

FIGS. 5 and 6 graphically depict power-up and power-down transient voltage curves, respectively. For purposes of this description and meaning of the appended claims the voltage curves are said to be "transient" because they define the supply voltage only during the short time between a call for a power state change and the full realization of that power state change. In both cases the power state change is depicted as being in relation to a reference voltage ("REF") such as, without limitation, electrical ground.

FIG. 5, for example depicts the transient supply voltage curve 160 from the time of the call to power-up the cache 126 (FIG. 3) at point 162 until the subsequent time when the desired operational supply voltage ("$V_{cc}$") is available from the power supply 132 (FIG. 3) at point 164. The available energy is directly related to the transient voltage. The operational supply voltage at point 164 is designed to meet the power requirements of the entire cache 126 (FIG. 3). The present embodiments advantageously use subportions of the cache 126 that are operable at reduced energy levels, such as at point 166 during the power-up transient supply power cycle defined by transient supply voltage curve 160.

FIG. 6 depicts a different transient supply voltage curve 170 from the time of a call to power-down the cache 126 (FIG. 3) at point 172 until the subsequent time when the desired reference voltage (REF) is reached at point 174. Similarly, the present embodiments advantageously reduce the size of the cache 126 (FIG. 3) so that it can still be used even at reduced voltage levels such as at point 176 during the power-down transient supply energy cycle defined by transient supply voltage curve 170.

Figure 7:
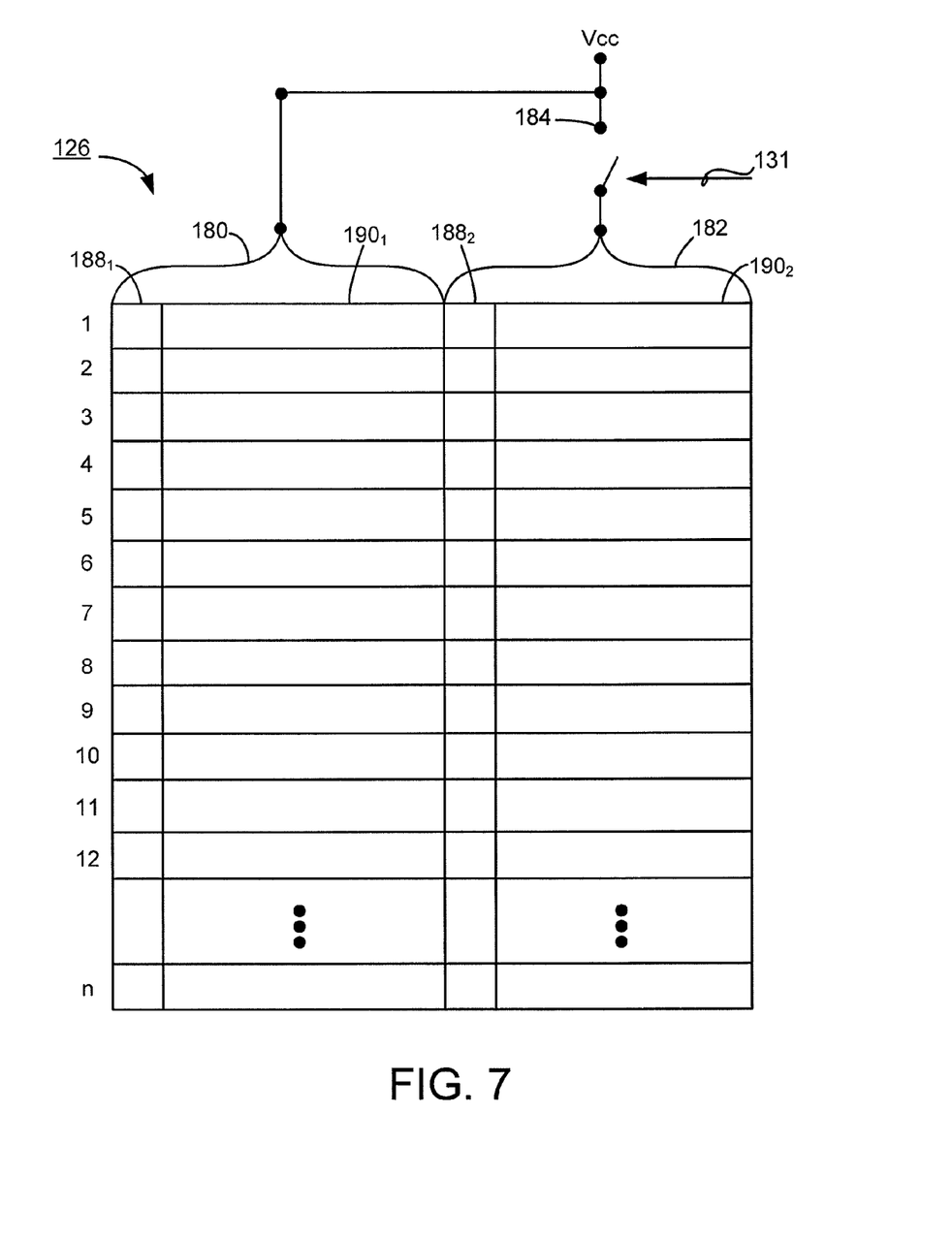
FIG. 7 diagrammatically depicts the cache as constructed of an associative memory with a predefined number of ways and circuitry to vertically partition the cache along the ways.

FIG. 7 depicts a logical mapping of the entirety of the storage space provided by the cache 126 (FIG. 3). In these illustrative embodiments vertical partitioning of the cache 126 is employed, although the claimed invention is not so limited to these illustrative embodiments. In equivalent alternative embodiments horizontal partitioning or other known manners of partitioning the cache 126 can be employed.

The cache 126 depicted in FIG. 6 employs a set-associative cache with two ways 180, 182. The way 182 is selectively powered by the supply voltage $V_{cc}$ upon actuation of a switching device 184. The switching device 184 can be, without limitation, responsive to a time-varying command profile to transition a source-drain conductivity of the switching device between a non-conductive state and a conductive state in selectively powering the variable way 182. The time-varying command profile can be generated by indexing a stored profile data table in relation to observed and/or predicted values of the transient energy. In equivalent alternative embodiments the time-varying command profile can be generated by one or more couplings of a resistor with a capacitor to form an RC circuit that is responsive to observed and/or predicted values of the transient voltage.

The depiction and corresponding description of the cache 126 having two ways 180, 182, with one of the ways 182 being selectively powered, is merely illustrative and not in any way limiting of the disclosed and claimed embodiments. In equivalent alternative embodiments the cache 126 can have any number (N) of ways, and the ways can each be selectively powered or they can be selectively powered in subgroups of the ways.

The associative cache 126 depicted in FIG. 7 is effectively an array of cache lines $186_1$, $186_2$, ... $186_n$. Each entry in a particular cache line 186 has the same index, but different respective tags 188 and corresponding user data 190. Thus, the associative cache 126 in these depicted embodiments allows two entries to be cached that have the same index value, but are in different "blocks" of memory by virtue of the vertical partitioning into the ways 180, 182.

In accordance with these illustrative embodiments, either only the one way 180 can be powered or both ways 180, 182 can be powered. In other words, the way 180 is a "permanently" powered way, meaning it is powered whenever the cache 126 is enabled whatsoever. Conversely, the way 182 is a "variable" powered one-way segment which can be selectively powered to take advantage of operating only a portion (in this case about half) of the cache 126 at a reduced supply voltage. This structure can be referred to as providing an "elastic" cache in that its size can be elastically and dynamically changed, making it possible to use one or more portions of the cache at less than full power rating.

Partitioning along the ways 180, 182 allows the cache 126 partitions to be powered on/off without affecting the address compare logic or the data in other cache partitions. With vertical partitioning, changing power states of the cache 126 does not require a flush and reload of the entire cache 126. To ensure data coherency, particularly of all dirty data 190 when the cache 126 is operating in a write-back mode, the data 190 must be flushed from way 182 before removing power from that way 182.

Figure 8:
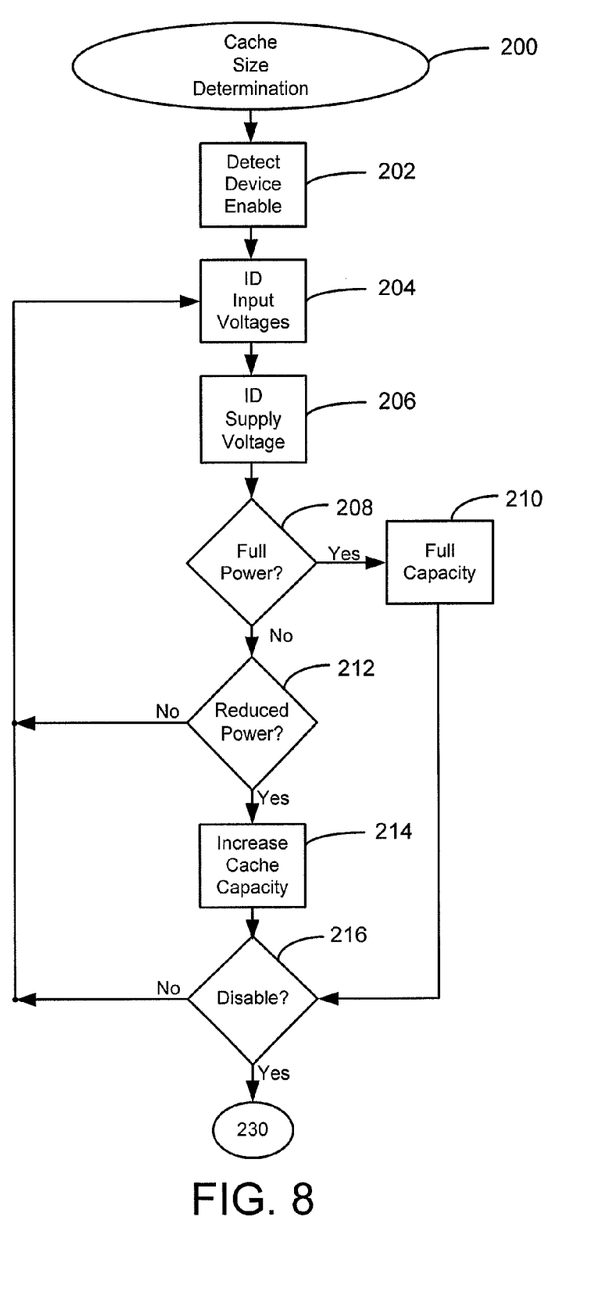
FIG. 8 is a flowchart depicting steps in a method of CACHE SIZE DETERMINATION in accordance with embodiments of the present invention.

In reference to the transient power-up supply curve 160 in FIG. 5 and the descriptions thereof, operation of the cache size determiner circuitry 130 (FIG. 4) in performing steps in a method of CACHE SIZE DETERMINATION 200 is depicted in the flow chart of FIG. 8 in accordance with illustrative embodiments of the present invention. In block 202 the cache size determiner (FIG. 3) detects a device enable ("EN") signal (FIG. 4) from the power module (FIG. 2) in response to a command associated with transferring data. Of course the EN signal would only be necessary if the supply power to the cache has been reduced or shut off due to inactivity and the like. If the cache is already fully powered, then step 202 and its need to detect an EN signal would be superfluous because the cache would already be fully enabled.

Assuming for purposes of these illustrative embodiments that the cache has previously been powered off such as for a power saving mode, then the input energy at that time is associated with $V_{REF}$ as indicated at time t=0 in FIG. 5. In block 204 the cache size determiner recalls from memory stored predetermined values for the minimum supply energy at which the one way 180 and then subsequently both ways 180, 182 of the cache can be utilized in processing commands. By way entirely of illustration, assume the entire cache is manufactured with a specified rating of 36 milliamps (mA) and a minimum input voltage of 2.3V. However, it has been determined either by the manufacturing specifications or empirically that operating only half of the cache, powering only way 180, can be accomplished at the same amperage but at 1.4V. In that illustrative case those two supply voltages (1.4V, 2.3V) are previously stored in memory and recalled for use by the cache size determiner in block 204.

In block 206 the cache size determiner monitors a supply energy to the cache following the EN signal. As described, the cache can do that by processing the signal from the analog to digital converter (ADC) between the supply path to the cache and the cache size determiner. Generally, the cache size determiner generates a time-varying command profile in relation to the transient energy event in order to selectively actuate the switching device and thereby, in turn, to dynamically change the data capacity of the cache. Instead of directly monitoring the actual transient available energy, in alternative equivalent embodiments the cache size determiner can recall from memory previously stored tabular time wise data that approximates the expected transient available energy curve depicted in FIG. 4. Alternatively, the cache size determiner can include an RC circuit tuned to pass control voltage(s) at the desired levels. Although the latter embodiments perhaps offer a simpler solution, a stored data or hardware-dedicated approximation of the actual transient energy profile cannot, unless continuously updated, account as well for system variation such as from temperature swings and chronological age of the components, and the like.

In block 208 it is determined, by comparing the instantaneous available energy (during the transient supply voltage cycle depicted in FIG. 5) to the higher predetermined threshold of at least 2.3V, whether or not sufficient power is presently being supplied to operate the entire cache. If the determination of block 208 is "yes," then control passes to block 210 where the cache size determiner dynamically changes the data storage capacity of the cache to full capacity by switching on $V_{cc}$ to power the permanent way and also by closing the switch to power the variable way.

If, however, the determination of block 208 is "no," then control passes to block 212 where it is determined, again comparing the instantaneous available energy but this time to the lower predetermined threshold of at least 1.4V, whether or not sufficient power is presently being supplied to partially operate just the permanent way portion of the cache. If the determination of block 212 is "yes," then control passes to block 214 where the cache size determiner dynamically changes the data storage capacity of the cache to half capacity by switching on $V_{cc}$ to power the permanent way, but not closing the switch to power the variable way. If no device disable signal is received by the cache size determiner in block 216, then control loops back to block 204 where the supply voltage to the cache is subsequently re-sampled and the steps of the method repeat as described above.

In these described embodiments the cache size determiner sets a first data storage capacity of the cache in relation to a first predetermined threshold voltage associated with the minimum power necessary to operate half of the cache. The cache size determiner subsequently sets a different data storage capacity of the cache associated with the minimum power necessary to operate the full cache. As discussed, in alternative equivalent embodiments the size with which the cache is dynamically changed can be more granular than half the cache size. For example, without limitation, the skilled artisan will understand that in equivalent alternative embodiments three such predetermined threshold energy levels could trigger the cache size determiner to power up the cache first to a one-third capacity, then to two-thirds capacity, and finally to full capacity. In that event the cache size determiner sets the cache storage capacity to an intermediate size between the initial and final sizes.

Figure 9:
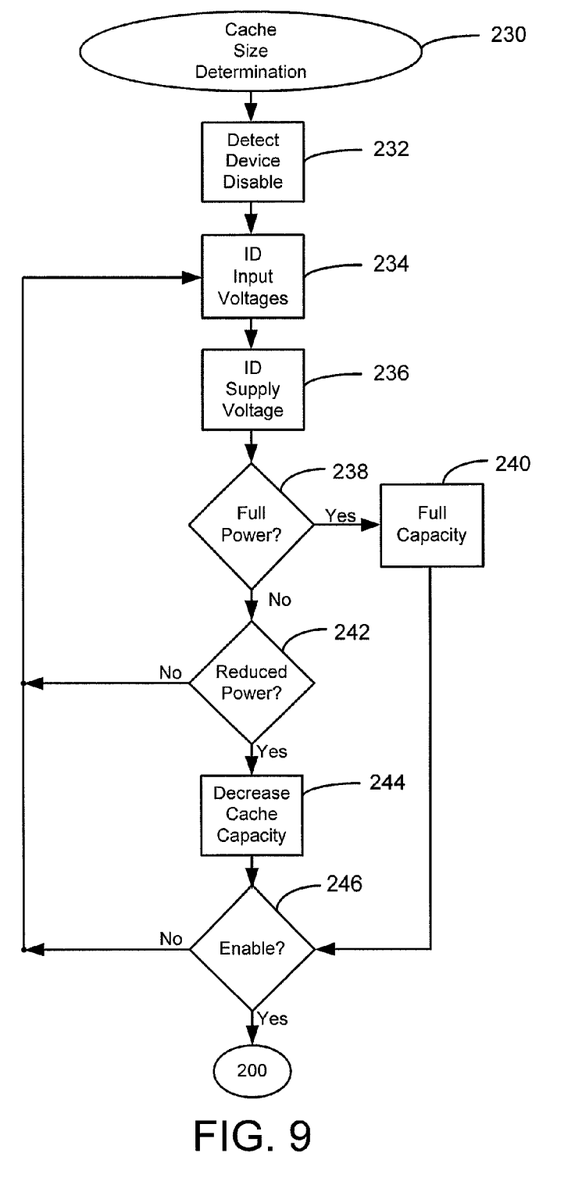
FIG. 9 is a flowchart depicting steps in a method of CACHE SIZE DETERMINATION in accordance with embodiments of the present invention.

Now conversely, in reference to the transient power-down supply curve 170 in FIG. 6 and the descriptions thereof, operation of the cache size determiner circuitry 130 (FIG. 4) in performing steps in a method of CACHE SIZE DETERMINATION 230 is depicted in the flow chart of FIG. 9 in accordance with illustrative embodiments of the present invention. In block 232 the cache size determiner (FIG. 4) detects a device disable signal from the power module (FIG. 2), either in response to or in the absence of command activity. Of course, the disable signal would only be necessary if full or at least partial supply power is present. If the cache is not already powered-up, then step 232 and its need to detect a disable signal would be superfluous because the cache would already be disabled.

Assuming for purposes of these illustrative embodiments that the cache has previously been fully powered-on such as for normal operation, then the input voltage at that time is $V_{cc}$ as indicated at time t=0 in FIG. 6. In block 234 the cache size determiner recalls from memory the stored predetermined values for the minimum supply voltages at which both ways 180, 182 and then subsequently only one way 180 of the cache can be utilized in processing commands. For purposes of this description the same values used above (2.3V, 1.4V) are applied here as well.

In block 236 the cache size determiner monitors a supply voltage to the cache following the disable signal. Again, the cache can do that by processing the signal from the analog to digital converter (ADC) between the supply path to the cache and the cache size determiner. Generally, the cache size determiner generates a time-varying command profile in relation to the transient voltage in order to selectively actuate the switching device and thereby, in turn, to dynamically change the data capacity of the cache. Instead of directly monitoring the actual transient supply voltage, in alternative equivalent embodiments the cache size determiner can recall from memory previously stored tabular time wise data that approximates the expected transient supply voltage curve depicted in FIG. 4. Alternatively, the cache size determiner can include an RC circuit tuned to pass control voltage(s) at the desired levels. Although the latter embodiments perhaps offer a simpler solution, a stored data or hardware-dedicated approximation of the actual transient supply voltage profile cannot, unless continuously updated, account as well for system variation such as from temperature swings and chronological age of the components, and the like.

In block 238 it is determined, by comparing the instantaneous available energy (during the power-down transient supply voltage cycle depicted in FIG. 6) to the higher predetermined threshold of at least 2.3V, whether or not sufficient power is presently being supplied to operate the entire cache. Note that in the power-down cycle it is advantageous to compare observed or predicted transient voltage values to an appropriate marginalized threshold so as to avoid first finding out the cache size needs to be reduced but not having the necessary time to flush all the dirty data from that portion of the cache before powering it down.

If the determination of block 238 is "yes," then control passes to block 240 where the cache size simply maintains the data storage capacity of the cache at full capacity by not interrupting the switched-on $V_{cc}$ power to the permanent way and also by not interrupting the switched-on power to the variable way.

If, however, the determination of block 238 is "no," then control passes to block 242 where it is determined, again comparing the instantaneous supply voltage but this time to the lower predetermined threshold of at least 1.4V (marginalized), whether or not sufficient power is presently being supplied to partially operate just the permanent way portion of the cache. If the determination of block 242 is "yes," then control passes to block 244 where the cache size determiner dynamically changes the data storage capacity of the cache to half capacity by not interrupting the switched-on $V_{cc}$ to power the permanent way, but interrupting the switched-on power to the variable way. If no device enable signal is received by the cache size determiner in block 246, then control loops back to block 234 where the supply voltage to the cache is subsequently re-sampled and the steps of the method repeat as described above.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage array, it will be appreciated by those skilled in the art that the claimed subject matter is not so limited and various other processing systems can be utilized without departing from the spirit and scope of the claimed invention.

What is claimed:

1. An apparatus comprising:
a power module configured to selectively implement a power change to change an amount of power supplied to the apparatus from a first steady state operational power level to a different second steady state operational power level; and
data capacity determination logic including computer instructions stored in memory that are configured to change a data storage capacity of an electronic data storage memory when the apparatus is supplied with a predetermined power level between the first and second steady state operational power levels during the power change.

2. The apparatus of claim 1 wherein the data capacity determination logic is configured to monitor a power source to the memory during the power change.

3. The apparatus of claim 2 wherein the data capacity determination logic is configured to compare the power source to the predetermined power level.

4. The apparatus of claim 3 wherein the apparatus comprises an analog signal to digital signal converter device configured to compare the power source to the predetermined power level.

5. The apparatus of claim 1 wherein the data capacity determination logic is configured to predict a timewise approximation of when the power module will subsequently supply the predetermined power level during the power change.

6. The apparatus of claim 1 wherein the data capacity determination logic is configured to increase the data storage capacity of the electronic data storage memory.

7. The apparatus of claim 1 wherein the data capacity determination logic is configured to decrease the data storage capacity of the electronic data storage memory.

8. The apparatus of claim 1 wherein the data capacity determination logic is configured to change the data storage capacity of the electronic data storage memory when the apparatus is supplied with each of a plurality of different predetermined power levels between the first and second steady state operational power levels.

9. The apparatus of claim 1 wherein the memory comprises a set associative cache with a predefined number of ways and circuitry to selectively partition the cache in relation to the ways, and the data capacity determination logic is configured to selectively power the ways to change the data storage capacity.

10. The apparatus of claim 9 wherein a switching device is connected to one or more of the ways, and the data capacity determination logic is configured to selectively actuate the switching device in accordance with a time-varying command profile derived in relation to the power level during the power change to enable the corresponding one or more ways.

11. The apparatus of claim 10 wherein the time-varying command profile transitions a source-drain conductivity of the switching device between a non-conductive state and a conductive state.

12. The apparatus of claim 10 comprising a resistor coupled with a capacitor in an RC circuit that is responsive to the power change in deriving the time-varying command profile.

13. The apparatus of claim 10 comprising a stored profile data table that is responsive to the power change in deriving the time-varying command profile.

14. A method comprising:
   characterizing power supplied to an apparatus during a power change that changes the power supplied to the apparatus from a first steady state operational power level to a different second steady state operational power level; and
   changing a data storage capacity of a digital memory when the power supplied to the apparatus is a value between the first and second steady state operational power levels during the power change.

15. The method of claim 14 wherein the characterizing includes comparing a predetermined threshold to the power supplied to the apparatus.

16. The method of claim 14 wherein the changing includes setting a first capacity of the memory when the apparatus is supplied with a first power level and subsequently setting a different second capacity of the memory when the apparatus is supplied with a different second power level.

17. The method of claim 16 wherein the changing is characterized by the second capacity being a maximum capacity, and setting a third capacity of the memory when the apparatus is supplied with a third power level, the third capacity sized between the first capacity and the maximum capacity.

18. The method of claim 14 wherein the changing includes selectively partitioning a set associative cache in relation to one or more of a predefined number of ways, and the changing includes selectively powering the ways.

19. The method of claim 18 wherein the changing includes actuating a switching device that is connected to one or more of the ways, the actuating being in accordance with a time-varying command profile derived in relation to the power level during the power change to enable the corresponding one or more ways.

20. An apparatus comprising:
   a cache device;
   a power supply configured to invoke a power change to change power supplied to the apparatus from a first steady state operational power level to a different second steady state operational power level; and
   data capacity determination circuitry that is configured to change a data storage capacity of the cache device when the apparatus is supplied with a predetermined power level between the first and second steady state operational power levels during the power change.

* * * * *